United States Patent [19]

McDaniel et al.

[11] Patent Number: 4,900,704

[45] Date of Patent: Feb. 13, 1990

[54] PEPTIZED AND PHOSPHATED INORGANIC OXIDES AND CATALYSTS SUPPORTED ON SAID OXIDES

[75] Inventors: Max P. McDaniel; Emory W. Pitzer, both of Bartlesville; Floyd E. Farha, Jr., Oklahoma City, all of Okla.

[73] Assignee: Phillips Petroleum Company, Bartlesville, Okla.

[21] Appl. No.: 250,589

[22] Filed: Sep. 29, 1988

[51] Int. Cl.$^4$ .................... B01J 21/04; B01J 27/188; B01J 32/00
[52] U.S. Cl. .................................. 502/210; 502/208; 502/439
[58] Field of Search .................... 502/208, 210, 439; 423/308, 309, 311

[56] References Cited

U.S. PATENT DOCUMENTS

| | | | |
|---|---|---|---|
| 4,009,125 | 2/1977 | Geierhaas et al. | 252/465 |
| 4,113,661 | 9/1978 | Tamm | 252/465 |
| 4,120,826 | 10/1978 | Ebel et al. | 252/465 |
| 4,289,863 | 9/1981 | Hill et al. | 502/210 X |
| 4,397,765 | 8/1983 | McDaniel | 252/430 |
| 4,444,965 | 4/1984 | McDaniel et al. | 502/208 X |
| 4,659,690 | 4/1987 | McDaniel et al. | 502/439 |
| 4,788,171 | 11/1988 | Klendworth | 502/208 X |

*Primary Examiner*—W. J. Shine
*Attorney, Agent, or Firm*—Lynda S. Jolly

[57] ABSTRACT

Fine, pure, boehmite alumina crystallites are peptized, partially precipitated and phosphated, hardened, and dried to form a xerogel. The alumina can be impregnated with a chromium compound. The chromium-containing catalyst is activated by calcination. The activated catalyst can be used as a polymerization catalyst to polymerize mono-1-olefins.

18 Claims, No Drawings

PEPTIZED AND PHOSPHATED INORGANIC OXIDES AND CATALYSTS SUPPORTED ON SAID OXIDES

BACKGROUND OF THE INVENTION

This invention relates to the preparation of supports and catalysts which can be used to polymerized mono-1-olefins, such as ethylene.

Supported chromium catalysts have long been a dominant factor in the production of high density olefin polymers such as polyethylene. As originally commercialized, these catalysts were used in solution polymerization processes. However, it early became evident that a more economical route to many commercial grades of olefin polymers was a slurry process, that it, a polymerization process carried out at a temperature low enough that the resulting polymer is largely insoluble in the diluent. However, certain control techniques which are easily carried out in solution polymerization systems become more difficult in the slurry system. This is particularly true with regard to control of molecular weight. In a solution system, the temperature can simply be increased in order to provide a lower molecular weight, higher melt flow polymer. However, in slurry systems, there is a practical limit on temperature increases, since the point is quickly reached wherein the polymer goes into solution and thus the value of the slurry system is lost.

In order to allow maximum utilization of the more commercially desirable slurry system, modifications of the catalyst were developed so as to allow the production of higher melt flow polymer. One such modification is the formation of hydrogels comprising silica and other, optional, inorganic oxides. Unfortunately, these types of hydrogels can be costly and time consuming to prepare and, also, tend to have a low pore volume and high surface area. Furthermore, supported chromium catalysts do not always have a high activity, as expressed by grams of polymer produced by grams of catalyst per unit of time.

SUMMARY OF THE INVENTION

It is an object of this invention to provide an improved catalyst support.

It is another object of this invention to provide an improved polymerization catalyst.

It is a further object of this invention to provide an improved polymerization process.

It is a further object of this invention to provide an improved olefin polymerization process.

It is yet a further object of this invention to provide an improved process for preparing supported chromium olefin polymerization catalysts.

It is still a further object of this invention to provide a high activity catalyst capable of giving a high melt index polymer.

It is yet a further object of this invention to provide a polymer with a broad molecular weight distribution.

It is yet a further object of this invention to provide a catalyst and catalyst support which has an increased pore volume.

It is still a further object of this invention to provide a catalyst and catalyst support which have a decreased surface area and maintain or increase catalytic polymerization activity.

In accordance with this invention a phosphated alumina xerogel is prepared by peptizing a fine, pure boehmite alumina, partially precipitating and phosphating the peptized alumina with a phosphating agent, further hardening the precipitated and phosphated alumina, removing substantially all of the water from the thus further hardened phosphated alumina, and drying the thus substantially water-free phosphated alumina.

In accordance with another embodiment of this invention, the further hardened phosphated-alumina is aged.

In accordance with yet another embodiment of this invention, a chromium compound is incorporated into the phosphated alumina.

DESCRIPTION OF THE PREFERRED EMBODIMENTS

Supports

The starting material for the catalyst supports of this invention are types of boehmite alumina that consist of small boehmite crystallites, often referred to as pseudo-boehmite. Such an alumina is available as a high-purity, white, spray-dried powder from Vista Chemical Company in Houston, Tex., and is called Catapal ® alumina. The chemical composition of the alumina used as the starting material comprises by weight percent about 68 to about 74% $Al_2O_3$, less than about 0.5% carbon, less than about 0.01% $SiO_2$, less than about 0.01% $Fe_2O_3$, less than about 0.01% $Na_2O$, less than about 0.25% $TiO_2$, and the balance is compounds that are lost on ignition. The bulk density of the starting alumina is within the range of about 690 to about 850 gm/liter, preferably within the range of about 700 to about 850 gm/liter for best results. All references to alumina in this disclosure, unless stated otherwise, refer to the boehmite alumina described above.

Preparation, or treatment, of the alumina involves a series of sequential steps. First, the alumina is peptized with a sufficient amount of a peptizing agent to form a clear solution. Useful peptizing agents are those that do not impart residual contaminant materials, and, when combined with water and the alumina form a clear solution. Exemplary peptizing agents include nitric acid, aluminum nitrate, and mixtures thereof. Acids such as sulfuric acid and hydrochloric acid can also be used as peptizing agents, but are less preferred due to possible sulfate and chloride contamination.

The peptizing procedure preferably is carried out in an aqueous solution. The alumina, which is insoluble in water, is combined with water; the peptizing agent is added to the water-alumina mixture. The amount of peptizing agent added to the water-alumina mixture is an amount to cause substantially all of the alumina to peptize, or dissolve, but not enough to convert the alumina to an aluminum salt. As used in this disclosure, "peptize" and "dissolve" can be used interchangeable, and mean that a substantially clear solution is formed; however, the solute, i.e., alumina, is not necessarily in an ionic form, but can contain solids and exists as a very small particulate, or colloid.

Although the applicants do not wish to be bound by theory, it is theorized that a chemically different alumina can result depending on the peptizing agent(s) employed. For example, if only nitric acid is the peptizing agent, the alumina probably contains little or no aluminum nitrate. However, if aluminum nitrate is used as a peptizing agent, some aluminophosphate from this aluminum nitrate is probably also present in the final catalyst support. Since the resultant alumina can be chemically different, due to the presence or absence of aluminum nitrate, different physical properties of the resultant catalyst and polymer can result.

An insufficient amount of peptizing agent can result in an incomplete peptizing reaction, i.e., the alumina is not completely dissolved. Too much peptizing agent can result in the aluminum salt and, thus, result in a greater difficulty to later neutralize the aqueous solution. The mole ratio of peptizing agent to aluminum is usually in the range of about 1:50 to about 1:5, when a strong acid, such as nitric acid, is used preferably in the range of about 1:30 to about 1:10. Most preferably, the mole ratio of peptizing agent to aluminum is in the range of about 1:25 to about 1:15, for the reasons given above. When the peptizing agent is aluminum nitrate the mole ratio of peptizing agent to aluminum can be varied, preferably in the range of about 1:10 to about 1:0.5 and most preferably in the range of about 1:10 to about 1:1.

After the addition of a sufficient amount of peptizing agent and the aqueous solution is substantially clear, the aqueous solution is acidic. The pH of the aqueous solution is preferably in the range of about 0 to about 3, and most preferably in the range of about 0.5 to about 2. As stated earlier, a high pH can cause the alumina not to peptize.

The peptizing procedure can occur under conditions of time and temperature sufficient to dissolve the alumina. The length of time can vary, depending on the peptizing conditions. Usually, a time of less than about one hour is sufficient. The temperature of the solution can vary. Temperatures in the range of about 10° to about 100° C., preferably in the range of about 10° to about 40° C., can be used. Most preferably, for ease of operation, temperatures in the range of about 15° to about 30° C., about room temperature, are used.

After the alumina has been peptized, the alumina is subjected to a precipitating and phosphating treatment with a phosphating agent. Any phosphating agent that is soluble in an aqueous solution and that can cause the dissolved alumina to precipitate and can impart a phosphate treatment to the alumina can be used. Exemplary compounds include, but are not limited to, phosphoric acid, ammonium phosphates, di-hydrogen ammonium orthophosphate ($NH_4H_2PO_4$) and mono-hydrogen ammonium orthophosphate (($NH_4)_2HPO_4$).

The amount of phosphating agent added to the peptized alumina is any amount sufficient to maintain the catalyst support pore volume and surface area, as well as high catalyst activity. The mole ratio of phosphate to aluminum (P/Al) is usually in the range of about 0.05 to about 0.5, preferably in the range of about 0.1 to about 0.35. Most preferably, the phosphate to aluminum mole ratio is in the range of about 0.2 to about 0.3 to maximize the physical characteristics of the catalyst and to maximize the catalyst activity.

The phosphating agent is added under conditions sufficient to provide a phosphate treatment to the alumina, as well as to partially precipitate the alumina. For ease of operation, the same conditions employed for the peptizing reaction can be used for the phosphating treatment.

The partially precipitated and phosphated alumina is further hardened by neutralizing the aqueous solution with a base selected from the group consisting of ammonia, ammonium hydroxide, alkyl ammonium hydroxides, amines, and mixtures thereof. Inorganic bases are preferred because they usually do not impart residual contaminant materials. Bases such as sodium hydroxide or potassium hydroxide can be used, but they are less preferred because they can result in sodium or potassium contamination.

The amount of inorganic base added to further harden the partially precipitated, phosphate alumina is an amount sufficient to cause the phosphated alumina to set-up as a cake, or brick. Generally, when the phosphated alumina sets-up as a cake, or brick, the pH of the solution is in the range of about 6 to about 10, preferably in the range of about 6 to about 8, and most preferably in the range of about 6.5 to about 7.5.

As with the preceding steps, the process to further harden the phosphated alumina can be carried out under any conditions. For ease of operation, the additional hardening of the phosphated alumina is carried out under conditions of ambient temperature and pressure. Under ambient conditions, and depending on the rate of addition of the inorganic base, the phosphated alumina can harden into a cake, or brick in a time of less than about 30 minutes.

Water can be removed from the further hardened phosphated alumina to form a substantially water-free xerogel by any manner known in the art wherein the physical integrity of the phosphated alumina, such as pore volume, is preserved. One method of water removal comprises first washing the phosphated alumina with a water-soluble organic compound. Exemplary water-soluble organic compounds include, but are not limited to, aliphatic alcohols having from about 1 to about 4 carbon atoms, such as methanol, ethanol, n-propanol, isopropanol, n-butanol, isobutanol, and mixtures thereof. After the water-soluble organic compound wash, the organic compound is removed by any method known in the art, such as oven or vacuum drying.

Other methods to remove water from the hardened phosphated alumina comprise azeotrope drying or spray drying the phosphated-alumina.

The precipitated and hardened phosphated alumina which has been further hardened by the addition of an inorganic base optionally can be aged prior to water removal. Aging can be advantageous in that aging can improve resistance to shrinkage during drying. If the phosphated-alumina is aged for a time in the range of about 0.1 to about 10 hours, preferably in the range of about 0.5 to about 7 hours. Most preferably, the aging time is in the range of about 1 to about 2 hours to obtain the best beneficial effects.

The temperature of the aging process is usually in the range of about 70° C. to about 100° C., preferably in the range of about 80° C. to about 100° C. Most preferably, the aging temperature is in the range of about 90° C. to about 100° C. to obtain the best beneficial effects.

The pH at which the phosphated-alumina is aged, for ease of operation, is about the pH of the solution after the inorganic base has been added.

Catalyst

The catalyst of this invention must contain a chromium compound. Chromium is preferably present in an amount in the range of about 0.1 to about 10 weight percent, most preferably in the range of about 0.5 to about 3 weight percent chromium calculated as $CrO_3$, based on the total weight of the catalyst (support plus chromium compound). These ranges of chromium content provide a catalyst that is excellent in activity.

The chromium compound can be incorporated in any of several ways. One method to incorporate a chromium compound is to use an aqueous solution of a water-soluble chromium compound, which is convertible to chromium oxide upon calcination. Such a water-soluble chromium compound can be introduced to the alumina simultaneously with the peptizing agent. If a water-soluble chromium compound is introduced with the peptizing agent, compounds which do not affect the pH are preferred. Examples include, but are not limited to, chromium acetate and chromium nitrate which precipitate out with the alumina. Chromium trioxide and other Cr(+6) compounds can also be used, but are less preferred because they are too soluble and tend to drain off with the excess water.

Water-soluble chromium compounds which inherently result in a higher pH can be added after the phosphating treatment. Such chromium compounds can be added in conjunction with the inorganic base and can aid the further hardening of the precipitated and hardened phosphated-alumina. Such chromium compounds include, but are not limited to, coordination chromium comounds having nitrogen-containing groups including double salts and chelates containing $NH_3$ or amines, such as the chromamines. Presently preferred pH increasing chromium compounds include chloropentamine chromium(III) chloride and hexamine-chromium-(III) nitrate because of reasonable availability.

A chromium compound can also be incorporated into the substantially water-free phosphated alumina. A hydrocarbon solution of a chromium compound convertible to chromium oxide can be used to impregnate the substantially water-free phosphated alumina. Examples of such materials include, but are not limited to, tert-butyl chromate, chromium acetylacetonate. Suitable solvents include, but are not limited to, pentane, hexane, benzene. An aqueous solution of a chromium compound can also be used after drying. Also, a chromium compound can simply be physically mixed with the support.

Calcination can take place by heating the chromium-impregnated phosphated alumina in the presence of an excess of molecular oxygen at a temperature within the range of about 300° to about 1000° C., preferably about 300° to about 800° C. for about 30 minutes to about 50 hours, more preferably about 2 to about 10 hours. At least a substantial portion of the chromium in low valence stage is converted to the hexavalent form. Preferably this is carried out in a stream of fluidizing air which stream of fluidizing air is continued as the material is cooled.

The supports and catalysts produced in accordance with this invention have a surface area of greater than about 180, but less than about 400 $m^2/gm$, preferably in the range of about 190 to about 270 $m^2/gm$. When nitric acid is the peptizing agent, the surface area most preferably is in the range of about 200 to about 230 $m^2/gm$. The pore volume of the supports and catalysts produced in accordance with this invention are greater than about 1.3 cc/gm, preferably in the range of about 2 to about 3 cc/gm. Most preferably, the pore volume is in the range of about 2.2 to about 2.9 cc/gm. However, as stated earlier, different peptizing agents can affect the physical properties of the supports and catalysts of this invention.

Polymerization

The catalysts of this invention can be used to polymerize at least one mono-1-olefin containing about 2 to about 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl-1-pentene, 1-octene and other higher olefins and conjugated or non-conjugated diolefins such as 1,3-butadiene, 1,4-pentadiene, 1,5-hexadiene, and other such diolefins and mixtures thereof. Ethylene copolymers preferably constitute at least about 90, preferably 97 to 99.8 mole percent polymerized ethylene units. With ethylene/hexene copolymers, about 98 to 99.8 mole percent ethylene is preferred, the remainder of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, gas phase polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,603 which issued Nov. 30, 1971 to Witt, the disclosure of which is hereby incorporated by reference.

The catalyst of this invention is particularly suitable for use in slurry polymerizations. The slurry, or particle form, process is generally carried out in an inert diluent (medium) such as paraffin, cycloparaffin or aromatic hydrocarbon. For predominantly ethylene polymers, a temperature of about 66° to about 110° C. is employed. Pressures in the particle form process can vary from about 110 to about 700 psia (0.65–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

Hydrogen can be used to control molecular weight, as is known in the prior art. When used, it is generally used at concentrations up to about 2 mole percent of reaction mixture, preferably within the range of about 0.1 to about 1 mole percent of reaction mixture.

Cocatalysts, to enhance the polymerization reaction, can be used as is known in the prior art. Examples of cocatalysts include, but are not limited to, triethylborane, diethylaluminum ethoxide, triethylaluminum, ethylaluminum sesquichloride, and mixtures thereof. When used, a cocatalyst is usually present at concentrations up to about 15 mole percent of reaction mixture, preferably within the range of about 0.1 to about 12 mole percent of the reaction mixture.

EXAMPLES

Examples I and II used Catapal ® alumina as the starting material, which is a fine, very pure boehmite alumina distributed by Vista Chemical Company, Houston, Tex. It is produced from the hydrolysis of aluminum alkyls and therefore is easily peptized in strong acidic aqueous media. The composition is about 70% by weight alumina after ignition (30% organics and water), 0.005% silica, 0.36% carbon. It has a starting porosity of about 0.4 to 0.5 cc/g and a surface area after calcination at 600° C. of about 220 $m^2/g$.

Polymerization tests were carried out in a two-liter stirred autoclave. Typically about 0.05 to 0.10 gm of activated catalyst was charged to the reactor under nitrogen, then one liter of isobutane liquid diluent containing 8 ppm of triethylboron was added, and finally ethylene was supplied on demand to maintain a fixed pressure of 550 psig. Polymerization occurred at 95° C. At the end of each run, the isobutane and ethylene were flashed off, leaving a dry polymer powder. Melt indices (MI) were determined at 190° C. in accord with ASTM 1238-65T condition E, and high load melt indices (HLMI) according to ASTM 1238-65T condition F. Surface areas were determined on 35–140 mesh samples using the standard nitrogen sorption BET method. Pore volumes were measured by alcohol adsorption according to the Journal of Colloid and Interface Science, Vol. 78 No. 1.

EXAMPLE I

Run 101 illustrates the preferred method of making a support and catalyst according to this invention. To a 4 liter beaker containing one liter of distilled water, 200 gm of Catapal ® grade hydrated aluminum oxyhydroxide (alumina) was added. The addition was made with rapid stirring to prevent clumps from forming. Next, 10 ml of concentrated nitric acid was added and the slurry heated to about 50°–60° C. Within a few minutes all of the Catapal ® had dissolved into the water. The amount of nitric acid added was quite small, not adequate to convert the aluminum to the nitrate, but enough to dissolve the alumina. This procedure is called peptization, since the alumina probably exists as a colloid. It is important in this step to combine the ingredients as described above. Changing the order of the addition leads to clumps of hard gel-like material which is difficult to handle and does not make a consistent catalyst.

To this clear solution, 54 ml of 85% phosphoric acid was added, i.e. enough to yield a P/Al mole ratio in the finished catalyst of 0.31; immediately, a thin white paste, or partial precipitate, formed. Then 75 ml of concentrated ammonium hydroxide was added and the slurry thickened into a gel with a pH of 7. The gel was slurried and stirred in 4 liters of isopropyl alcohol for about 15 minutes at about 40°–50° C. The gel was then removed from the alcohol wash by filtration on a Buchner funnel and was dried in a vacuum oven at 110° C. overnight and yielded a white powder. To form the active catalyst, 300 ml of a chromium acetate solution in methanol (0.01 gm Cr/ml) was added and the mixture dried under vacuum again at 110° C. overnight. Finally, a 10 gm sample of the material was calcined by fluidization in dry air at 600° C. for 3 hrs to form an orange, active catalyst. The chromium loading was about 1.5 weight percent, based on the total weight of the catalyst.

This catalyst was extremely active, producing 5386 gm polymer per gm of catalyst in 22 minutes, which is an hourly activity of about 14,700 gm/gm. The polymer had a high melt index (MI) of 2.6, and a high load MI (HLMI) of 198. Thus, the polymer had unusually high shear ratio (HLMI/MI of 76) which indicates a broad molecular weight distribution. High shear ratios are desirable in film and blow molding applications. Physical properties of the catalyst were determined and the results are given in Table I. Notice that the pore volume was extremely high, 2.85 cc/g, which probably accounts for the high activity. The surface area was 214 $m^2/g$, indicating that the procedure had maintained almost all of the 220 $m^2/g$ of the original Catapal ® starting material.

Run 102

Run 102 demonstrated how well the preferred procedure can be repeated. The preparation method of Run 101 was repeated. Surface area and pore volume were high, as in Run 101. Polymerization activity was 5280 gm/gm/hr. Again, the polymer exhibited an unusually high flow ratio, with melt index of 0.21, high load melt index of 52, and a shear ratio (HLMI/MI) of 248.

Run 103

Run 103 demonstrates the preferred procedure, except the peptizing was done at higher solids concentration. The method forms an acceptable catalyst, but better results were obtained at a lower solids level, as in Run 101. 316 gm of Catapal ® was slurried in 250 ml of water, to which 7.5 ml of concentrated nitric acid was added. At this high solids concentration, the peptization caused a thick paste to form. It further thickened when 27 ml of 85% phosphoric acid was added. The thick paste was split in half and 30 ml of concentrated ammonium hydroxide was added to one half, causing a hard gel to form. The hard gel was washed in 4 liters of isopropyl alcohol, dried overnight at 110° C. under vacuum, and crushed. Physical properties were determined on the 35–140 mesh fraction, and are shown in Table 1. Surface area is again high, but pore volume was considerably reduced, compared to Runs 101 and 102, to 1.72 cc/gm.

Run 104

Run 104 demonstrates the necessity of the alcohol wash step. The procedure of Run 101 was repeated, but the alcohol wash step was omitted and instead the gelation was done in the presence of a surfactant to reduce surface tension during drying. 400 g of Catapal ® powder was slurried in 2 liters of water, to which 20 ml of concentrated nitric acid and 30 gm of chromic (III) nitrate nonahydrate was added. The mixture was warmed until it formed a clear solution; then 20 ml of Siponic F-300 surfactant was added, which is a commercial grade of octylphenol ethoxylate obtained from Alcolac, Inc. of Baltimore, Md. To this solution was added 100 ml of 85% phosphoric acid, which, as above, caused a thickening of the now pasty material. Gelation was accomplished by adding 100 ml of concentrated ammonium hydroxide. The hard gel was dried without an alcohol wash under vacuum at 100° C. overnight, and after being crushed, it was activated in dry air at 600° C. for three hours.

By comparison to Runs 101 and 102 in Table I, it can be seen that the pore volume of this material was substantially reduced, to 1.44 cc/g. The catalyst exhibited poor activity when tested for ethylene polymerization, yielding only 772 g/g in 30 minutes, which is about 1540/hr.

Run 105

Run 105 again demonstrates the need for an alcohol wash step. The procedure of Run 103 was repeated except that 6.0 gm of Siponic F-300 surfactant was added to the peptized solution before gelation, and the alcohol wash step was ommitted. Comparing the physical properties in Table 1 of Runs 105 and 103 shows that omitting the alcohol wash, even with a surfactant present, greatly depresses the pore volume.

Run 106

Run 106 demonstrates the need to neutralize the pH to 7 or higher after peptization. As before, in Run 103, 316 gm of Catapal ® was slurried in 250 ml water which also contained 6.0 gm of Siponic F-300 surfactant. 7.5 ml of concentrated nitric acid was added with vigorous stirring. At this higher solids level, the peptization did not result in a solution. Instead a thick clear gel formed which turned very hard when 27 ml of 85% phosphoric acid was worked into it. Since a gel had already formed, the ammonium hydroxide was omitted and the material was simply dried, crushed, and activated as described above. Physical properties, which are shown in Table I, indicate an unacceptable catalyst due to extremely low surface area and pore volume. Comparison with Run 105 indicates the necessity of neutralizing the acid with ammonium hydroxide.

Run 107

Run 107 shows the need to peptize the Catapal ® in water, which hydrolizes Al—O—Al bonds, rather than alcohol. Into 5 l of methanol was slurried 1.0 Kg of Catapal ®, followed by a solution of 50 ml concentrated nitric acid and 70 ml water. It resulted in a thick paste. Then, a solution was added which consisted of 217 ml of 85% phosphoric acid, 50 ml water, and 62 gm of chromic (III) nitrate monohydrate. The paste became thinner. Then, gelation was accomplished by adding 250 ml ammonium hydroxide. A hard cake formed after being dried at 110° C. overnight. The material was crushed and sieved as before. Physical properties are shown below. Both surface area and pore volume were dimished compared to Runs 101 and 102.

Run 108

Run 108 demonstrates the need to peptize the Catapal ® with nitric acid. Again 316 gm of Catapal ® was slurried in 250 ml of water containing 6.0 ml of Siponic F-300 surfactant, as in Run 105. However, the nitric acid was omitted, and only the 27 ml of phosphoric acid was used as the acid source. A paste formed which was neutralized by 35 ml of concentrated ammonium hydroxide. Comparison of the physical properties in Table I with Run 105 demonstrates a further deterioration of pore volume and extremely low surface area.

Run 109

Run 109 again demonstrates the preferred procedure, but at a higher phosphate loading, that is at a P/Al mole ratio of 0.4 instead of 0.3. The procedure of Run 101 was repeated except that 15 ml nitric acid, 81 ml phosphoric acid, and 120 ml of ammonium hydroxide were used. Again, the inventive procedure of Run 109 exhibited high pore volume, but it can be seen in Table I that the surface area is lower in comparison to Runs 101 and 102. This is the expected consequence of adding more phosphate. But in comparison to conventional methods of phosphating pre-formed aluminas, it is remarkable how much phosphate could be added using the invention procedure without severe destruction of the surface area.

EXAMPLE II

Runs 201-204 demonstrate a conventional method of adding phosphate to a pre-formed alumina which is not a small boehmite crystallite. Ketjen Grade B alumina, available from Armak Co., of Houston, Tex. is a pre-formed alumina and was chosen because of its high surface area (300 $m^2$/gm) and pore volume (1.7 cc/gm). Optimization of a pre-formed alumina catalyst is preferably achieved by calcining the alumina before slurring in water or alcohol, then adding phosphoric acid. Thus, in these runs, 10 gm of Ketjen alumina, which had been calcined at 600° C., was slurried in 50 ml of methanol. Phosphoric acid and chromium acetate were slowly added. The excess alcohol was then evaporated off, and the catalyst activated in dry air at 700° C. for three hours. Despite the precalcining step and higher activation temperature in this series, it can be seen in Table 2 that phosphate greatly descreases the surface area and pore volume, which in turn decreases the activity. Thus, the inventive catalysts are unusual in that most of the surface is preserved (even without precalcining) and that high phosphate loadings are possible. This results in a catalyst with greater activity and greater melt index potential.

EXAMPLE III

These experiments employed the preferred procedure of Runs 101 and 102 at the lower solids concentration of 0.13 gm/ml, however, aluminum nitrate was substituted for nitric acid as the peptizing agent. Thus, some aluminophosphate precipitated out from this source of aluminum as well as from the Catapal ® when ammonium hydroxide was added. For example, in a typical experiment, 200 gm of Catapal ® (3 moles) was added to one liter of 80° C. water containing 0.3 moles of aluminum nitrate. Thus, 91% of the aluminum in the finished catalyst comes from the Catapal ®. Peptization of the Catapal ® by the acidic aluminum nitrate solution resulted in a gelatinous mass. Next, 50 ml of 85% phosphoric acid was added, forming a pasty liquid. Then, the chromium source was added, 20 gm of chromic (III) nitrate nonahydrate, and finally the liquid was gelled by adding 101 ml of concentrated ammonium hydroxide. The gel was aged for two hours at 80° C. in four liters of water containing another 50 ml of ammonium hydroxide. Upon filtration, the recovered gel was split in half. One half was dried in an oven overnight at 110° C. The other half was slurried in 4 liters of n-propanol and washed for another 30 minutes with alcohol. Then, it too was filtered and dried under vacuum at 110° C. Both halves were crushed, activated at 600° C., and tested for polymerization activity.

Table III lists the physical properties and polymerization results of nine samples made in this way. Notice that this procedure again provides high activity and polymer of unusually high flow ratio. Catalysts prepared in this manner seem to exhibit some advantages over the procedure of Runs 101 and 102. The aluminum nitrate procedure tolerates higher P/Al mole ratios than the nitric acid procedure of Runs 101 and 102 and can yield even higher surface areas. More importantly though, using aluminum nitrate as the peptizing agent seems to give much higher activity in the absence of an alcohol wash, particularly at high P/Al ratios. This can be seen by comparing Run 303 to Run 304, or comparing Run 306 to Run 307.

While this invention has been described in detail for the purpose of illustration, it is not to be construed as limited thereby but is intended to cover all changes and modifications within the spirit and scope thereof.

tion to form a partially precipitated, phosphated alumina;

(c) further hardening said partially precipitated, phosphated alumina by neutralizing the clear solution with a base selected from the group consisting of ammonia, ammonium hydroxide, alkyl ammonium hydroxides, amines, and mixtures thereof; and (d) removing substantially all water from the thus further hardened precipitate to form a substantially water-free phosphated alumina xerogel.

2. A process according to claim 1 further comprising incorporating a chromium compound into said phosphated alumina xerogel.

3. A process according to claim 1 further comprising aging the thus further hardened precipitate at a temper-

TABLE I

| Run | Alumina Concentration (gm/ml) | Peptizing Agent | $H_3PO_4$ Treatment (P/Al Mole Ratio) | Neutralization by $NH_4OH$ | Drying Method | Pore Volume (cc/gm) | Surface Area ($m^2$/gm) |
|---|---|---|---|---|---|---|---|
| 101 | 0.13 | $HNO_3/H_2O$ | 0.31 | Yes | Alcohol | 2.85 | 214 |
| 102 | 0.13 | $HNO_3/H_2O$ | 0.31 | Yes | Alcohol | 2.34 | 204 |
| 103 | 0.41 | $HNO_3/H_2O$ | 0.20 | Yes | Alcohol | 1.72 | 222 |
| 104 | 0.13 | $HNO_3/H_2O$ | 0.31 | Yes | Surfactant | 1.44 | 217 |
| 105 | 0.41 | $HNO_3/H_2O$ | 0.20 | Yes | Surfactant | 0.87 | 203 |
| 106 | 0.41 | $HNO_3/H_2O$ | 0.20 | No | Surfactant | 0.58 | 155 |
| 107 | 0.13 | $HNO_3$/MeOH | 0.31 | Yes | Alcohol | 1.27 | 172 |
| 108 | 0.41 | None | 0.20 | Yes | Surfactant | 0.53 | 131 |
| 109 | 0.13 | $HNO_3/H_2O$ | 0.40 | Yes | Alcohol | 2.36 | 162 |

TABLE II

COMPARISON WITH CONVENTIONAL PHOSPHATED PREFORMED ALUMINAS

| Run | P/Al (Mole Ratio) | Surface Area ($m^2$/gm) | Pore* Volume (cc/g) | Polymerization Activity (gPE/gcat/hr) | Melt Index | High Load Melt Index |
|---|---|---|---|---|---|---|
| 201 | 0.05 | 232 | 1.67 | 5140 | 0 | 0.6 |
| 202 | 0.10 | 195 | 1.55 | 4880 | 0.11 | 30 |
| 203 | 0.18 | — | — | 3480 | 0.3 | 44 |
| 204 | 0.20 | 121 | 1.19 | 2020 | 0.06 | 4.0 |
| 101 | 0.31 | 214 | 2.85 | 14,700 | 2.6 | 198 |
| 102 | 0.31 | 204 | 2.35 | 5280 | 0.21 | 52 |

*Determined by Alcohol Adsorption.

TABLE III

CATALYSTS MADE USING ALUMINUM NITRATE AS THE PEPTIZING AGENT

| Run | % of Al From Catapal ® | $H_3PO_4$ Treatment (P/Al Mole Ratio) | Alcohol Wash | Melt Index | High Load Melt Index | HLMI MI | Activity (gm Pe/gm Cat/hr) |
|---|---|---|---|---|---|---|---|
| 301 | 91% | 0.22 | No | 0.043 | 14.1 | 329 | 2960 |
| 302 | 91% | 0.22 | Yes | 0.077 | 18.6 | 241 | 4790 |
| 303 | 91% | 0.44 | No | 0.44 | 69.3 | 158 | 3960 |
| 304 | 91% | 0.44 | Yes | 1.5 | 169 | 113 | 4040 |
| 305 | 91% | 0.15 | No | 0.006 | 2.69 | — | 3050 |
| 306 | 75% | 0.50 | No | 0.18 | 36.1 | 200 | 3020 |
| 307 | 75% | 0.50 | Yes | 0.32 | 50.6 | 158 | 4120 |
| 308 | 50% | 0.15 | No | 0.10 | 17.9 | 179 | 3050 |
| 309 | 50% | 0.15 | Yes | 0.25 | 34.0 | 136 | 6130 |

*Surface Area 269 $m^2$/gm.
Pore Volume 2.72 cc/gm.

That which is claimed is:

1. A process to make a phosphated alumina xerogel comprising:
    (a) peptizing fine, pure, boehmite alumina crystallites with a peptizing agent selected from the group consisting of nitric acid, aluminum nitrate, and mixtures thereof to form a clear solution;
    (b) adding a phosphating agent selected from the group consisting of phosphoric acid, ammonium phosphates, and mixtures thereof to said clear soluature in the range of about 70° C. to about 100° C., for a time in the range of about one-half to about 7 hours, at a pH in the range of about 6 to about 8.

4. A process according to claim 1 wherein said peptizing agent is added in an amount sufficient to peptize substantially all of the alumina.

5. A process according to claim 1 wherein said phosphated alumina xerogel has a P/Al mole ratio in the range of about 0.05 to about 0.5.

6. A process according to claim 1 wherein said base is added in an amount sufficient to result in a pH in the range of about 6 to about 10.

7. A process according to claim 1 wherein substantially all water is removed by washing the further hardened precipitate with an aliphatic alcohol having from about 1 to about 4 carbon atoms.

8. A process according to claim 1 wherein substantially all water is removed by azeotrope drying.

9. A process according to claim 1 wherein substantially all water is removed by oven drying.

10. A process according to claim 1 wherein substantially all water is removed by spray drying.

11. A process according to claim 2 further comprising the step of heating the thus chromium impregnated xerogel at a temperature in the range of about 300° to about 1000° C., for a time in the range of about 30 minutes to about 50 hours, in an oxidizing atmosphere.

12. A catalyst support produced by the process of claim 1.

13. A catalyst produced by the process of claim 11.

14. A process to make a phosphated alumina xerogel comprising the steps of:
(a) peptizing fine, pure, boehmite alumina crystallites with a peptizing agent selected from the group consisting of nitric acid, aluminum nitrate, and mixtures thereof to form a clear solution;
(b) adding phosphoric acid to form a partially precipitated, phosphated alumina;
(c) further hardening said partially precipitated, phosphated alumina by neutralizing the clear solution with ammonium hydroxide;
(d) washing the thus further hardened phosphated alumina with isopropyl alcohol to form a substantially water-free precipitate; and
(e) drying the substantially water-free precipitate to form a xerogel.

15. A process according to claim 14 further comprising the step of incorporating a chromium compound into said xerogel.

16. A process according to claim 15 further comprising the step of heating the thus chromium impregnated xerogel at a temperature in the range of about 300° to about 1000° C., for a time in the range of about 30 minutes to about 50 hours, in an oxidizing atmosphere.

17. A catalyst support produced by the process of claim 14.

18. A catalyst produced by the process of claim 16.

* * * * *

UNITED STATES PATENT AND TRADEMARK OFFICE
CERTIFICATE OF CORRECTION

PATENT NO. : 4,900,704
DATED : February 13, 1990
INVENTOR(S) : McDaniel et al

It is certified that error appears in the above-identified patent and that said Letters Patent is hereby corrected as shown below:

Column 12, claim 1, line 9, please delete "precipitate", and insert therefor --- partially precipitated, phosphated alumina ---.

Signed and Sealed this

Twenty-sixth Day of November, 1991

Attest:

HARRY F. MANBECK, JR.

*Attesting Officer*　　　　*Commissioner of Patents and Trademarks*